United States Patent
Aoki et al.

(10) Patent No.: US 7,232,022 B2
(45) Date of Patent: Jun. 19, 2007

(54) CLUTCH-PURPOSE HYDRAULIC SERVO

(75) Inventors: Toshihiko Aoki, Anjo (JP); Takuya Fujimine, Anjo (JP); Minoru Todo, Anjo (JP); Kazuhisa Ozaki, Anjo (JP); Hirofumi Ota, Toyota (JP); Akira Hoshino, Nishikamo-gun (JP); Atsushi Tabata, Okazaki (JP); Akiharu Abe, Toyota (JP); Masafumi Kinoshita, Toyota (JP); Atsushi Honda, Seto (JP); Kazutoshi Nozaki, Aichi-gun (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/584,585

(22) Filed: Oct. 23, 2006

(65) Prior Publication Data

US 2007/0102257 A1   May 10, 2007

Related U.S. Application Data

(63) Continuation of application No. 11/017,061, filed on Dec. 21, 2004, now abandoned.

(30) Foreign Application Priority Data

Dec. 25, 2003 (JP) .............................. 2003-431610
Nov. 2, 2004 (JP) .............................. 2004-319782

(51) Int. Cl.
  *F16D 25/0638* (2006.01)
  *F16D 25/10* (2006.01)

(52) U.S. Cl. .............................. 192/106 F; 192/85 AA; 192/87.11

(58) Field of Classification Search ............. 192/106 F
  See application file for complete search history.

(56) References Cited

U.S. PATENT DOCUMENTS

| 4,957,195 A | 9/1990 | Kano et al. |
| 2001/0017251 A1 | 8/2001 | Han et al. |
| 2003/0224900 A1 | 12/2003 | Sugiura et al. |
| 2003/0232675 A1 | 12/2003 | Miyazaki et al. |

FOREIGN PATENT DOCUMENTS

| JP | A 2003-247612 | 9/2003 |
| JP | A 2004-019830 | 1/2004 |

*Primary Examiner*—Richard M. Lorence
(74) *Attorney, Agent, or Firm*—Oliff & Berridge, PLC (57) ABSTRACT

In a hydraulic servo for a clutch, a cancel plate is disposed on a second clutch drum that undergoes the same rotation as a second clutch drum provided with a cylinder portion, in such a fashion that the cancel plate is restricted from moving to a side opposite from a return spring in an axial direction. The first clutch drum is disposed, as a separate member, on the second clutch drum. A step portion of the second clutch drum prevents the first clutch drum from moving to a side opposite from the cancel plate. Due to the spring force of the return spring, the oil pressure in the cancel oil chamber and the oil pressure in the operating oil chamber, the force that presses the first clutch drum to the step portion is always greater than the force that presses the first clutch drum to the cancel plate side.

14 Claims, 4 Drawing Sheets

CLUTCH-PURPOSE HYDRAULIC SERVO

This is a Continuation of application Ser. No. 11/017,061 filed Dec. 21, 2004, now abandoned.

INCORPORATION BY REFERENCE

The disclosures of Japanese Patent Applications Nos. 2004-319782 filed on Nov. 2, 2004 and JP 2003-431610 filed on Dec. 25, 2003, including the specification, drawings and abstract are incorporated herein by reference in their entireties.

BACKGROUND

1. Field

The disclosure relates to a hydraulic servo of a clutch for performing and discontinuing power transfer which is for use in, for example, vehicular automatic transmissions and the like. More particularly, the disclosure relates to a clutch-purpose hydraulic servo in which a drum member is disposed as a separate member on a shaft member.

2. Description of the Related Art

Generally, in a hydraulic servo of a clutch for use in, for example, a vehicular automatic transmission or the like, an operating oil chamber is formed between a piston and a cylinder portion, and is equipped with a cancel plate and a return spring for pushing the piston back toward the cylinder portion when the clutch is released. It is necessary that the relative position of the cancel plate be fixed with respect to the cylinder portion. Therefore, for example, the cancel plate is restricted with respect to a clutch drum having the cylinder portion by a snap ring or the like so that the cancel plate does not move to a side opposite from the return spring.

When a clutch is disposed in an automatic transmission or the like, there often exists another member that undergoes substantially the same rotation, such as an input shaft, or a clutch drum of another clutch, etc. If, in such a case, a hub-shaped (sleeve-shaped) member is provided so as to extend at an inner peripheral side of the cylinder portion and a cancel plate is provided on an outer peripheral side of the hub-shaped member, the double structure formed by the hub-shaped member and the member that undergoes the same rotation becomes an impediment to a compact design. This is avoided by the arrangement as described in, for example, Japanese Patent Application Laid-Open No. 2003-247612 (specifically, the members represented by reference numerals 12, 32 in FIG. 3 of the laid-open application). That is, the cancel plate and a member (e.g., a clutch drum) having the cylinder portion are disposed immediately on the outer peripheral side of a member (e.g., an input shaft) that undergoes the same rotation as mentioned above, and the member having the cylinder portion is fixed to the member that undergoes the same rotation by, for example, welding or the like. Therefore, the member having the cylinder portion and the member that undergoes the same rotation are structured integrally as a unit.

However, the integration of the member having a cylinder portion with the member that undergoes the same rotation through fixation thereof by, for example, welding or the like, requires a welding process (integrally forming process) or the like in the assembly of a clutch (automatic transmission), and therefore has the problem of impeding improvement in the ease of assembly and reduction of the production process and the production cost.

SUMMARY

Accordingly, there is an object to provide a clutch-purpose hydraulic servo that allows improvement in the ease of assembly and a reduction in the production processes and costs while allowing a compact design.

In a clutch-purpose hydraulic servo according to a first aspect, a cylinder member is disposed as a separate body on a shaft member on which a cancel plate is disposed and which undergoes the same rotation as the cylinder member. A stopper device prevents the cylinder member from only the movement, relative to the shaft member, to a side opposite from the cancel plate in an axial direction. The movement of the cylinder member to a cancel plate side in an axial direction is restricted by such an arrangement that the force that presses the cylinder member to a stopper device side is always greater than the force that presses the cylinder member to a cancel plate side on the basis of the spring force of a return spring, the oil pressure in a cancel oil chamber and the oil pressure in an operating oil chamber. Therefore, this structure allows the cylinder member to be a separate member from the shaft member and to be pressed and fixed to the stopper device side, and therefore allows elimination of the process of integrating the cylinder member and the shaft member by, for example, welding or the like, while facilitating a compact design as compared with, for example, a structure where a cancel plate is provided on a hub-shaped member that extends at an inner peripheral side of the cylinder member. Therefore, the clutch-purpose hydraulic servo allows improvement in the ease of assembly and reduction of the production processes and costs.

The clutch-purpose hydraulic servo according to a second aspect includes a seal device that seals a gap between the shaft member and the cylinder member. Therefore, the oil in the operating oil chamber can be sealed in. Hence, it becomes possible to provide the shaft member and the cylinder member as separate members.

The clutch-purpose hydraulic servo according to a third aspect is used in a first clutch whose cylinder member is enclosed in a drum member that meshes with a friction plate of a second clutch, and the shaft member is a drum member of the second clutch. Therefore, the clutch-purpose hydraulic servo can be used in a structure where two clutches are disposed within a clutch drum.

In the clutch-purpose hydraulic servo according to a fourth aspect, the friction plate is spline-mated directly with the drum member of the second clutch instead of being connected for actuation to the cylinder member of the first clutch. Therefore, the first clutch can be formed without a particular need to provide the first clutch with a clutch drum, and the first clutch can be made compact.

In the clutch-purpose hydraulic servo according a fifth aspect, the cylinder member is formed by a drum member that has a drum portion that is spline-mated with the friction plate, and the drum member is spline-mated with the drum member of the second clutch so that the drum member is not rotatable relative to the drum member of the second clutch. Therefore, the first clutch can be formed without the need to form the clutch drum of the second clutch in a complicated configuration.

In the clutch-purpose hydraulic servo according to a sixth aspect, the stopper device is a step portion formed in the drum member of the second clutch. Therefore, the process of mounting a member as a stopper device can be eliminated. Hence, it becomes possible to improve the ease of assembly and reduce the production process and the production cost.

In the clutch-purpose hydraulic servo according to a seventh aspect, the step portion is formed on an inner peripheral side of an outer peripheral portion of the drum member of the second clutch. Therefore, for example, when splines for spline-mating the drum member of the second clutch and the drum member of the first clutch are formed on the inner peripheral side of the outer peripheral portion of the drum member of the second clutch and an outer peripheral side of the drum member of the first clutch, the step portion can simultaneously be formed. Hence, the production process can be reduced.

In the clutch-purpose hydraulic servo according to an eighth aspect, the step portion is formed on an outer peripheral side of an inner peripheral portion of the drum member of the second clutch. Therefore, although in some cases a piston member of the second clutch is provided with a (penetrating) cutout in order to achieve contact between the outer peripheral portion of the drum member of the second clutch and an outer peripheral portion of the drum member of the first clutch, this aspect eliminates the need to form such a cutout. Therefore, the step portion can easily be formed in the production process.

In the clutch-purpose hydraulic servo according to a ninth aspect, the stopper device is a snap ring fastened to the shaft member. Therefore, what is required is a relatively easy process of merely attaching a snap ring, as compared with a process of integrating the cylinder member and the shaft member by, for example, welding or the like. Thus, it becomes possible to improve the ease of assembly and reduce the production process and the production cost.

The clutch-purpose hydraulic servo according to a tenth aspect is used in a vehicular automatic transmission. Therefore, it becomes possible to improve the ease of assembly of the vehicular automatic transmission and reduce the production process and the production cost thereof.

BRIEF DESCRIPTION OF THE DRAWINGS

The exemplary embodiments will be described with reference to the drawings in which.

DETAILED DESCRIPTION OF PREFERRED EMBODIMENTS

Figure 1:
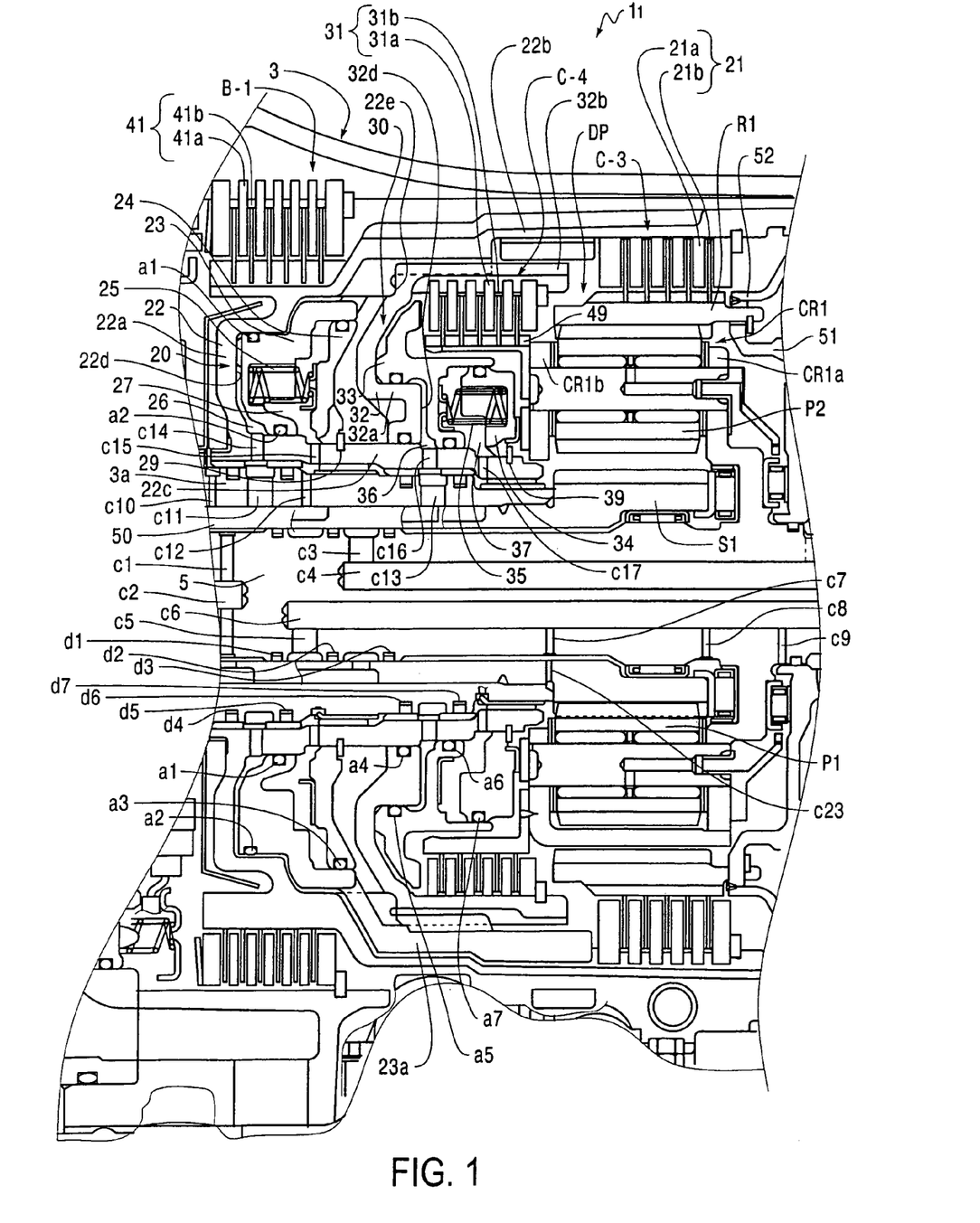
FIG. 1 is a sectional view showing a portion of an automatic transmission according to a first exemplary embodiment.

A first exemplary embodiment will be described hereinafter with reference to FIG. 1. FIG. 1 is a sectional view showing a portion of an automatic transmission $1_1$ according to the first embodiment.

In the following description, the upward, downward, leftward and rightward directions in FIG. 1 correspond to the actual upward, downward, forward and rearward directions, respectively, with respect to a real vehicular automatic transmission (which will also be simply referred to as an "automatic transmission" below) $1_1$. Furthermore, a direction along the length of an input shaft 5 will be referred to as an "axial direction", and a direction orthogonal to the axial direction will be referred to as a "radial direction". With regard to the position in a radial direction, a side relatively close to the input shaft 5 will be referred to as a "radially inward side (inner peripheral side)" and a side relatively remote from the shaft will be referred to as a "radially outward side (outer peripheral side)"

As shown in FIG. 1, an automatic transmission $1_1$ suitable for use in, for example, an FR type (front engine, rear wheel drive) vehicle, is provided with an input shaft 5 of a speed change mechanism connected to an engine or the like via a torque converter (not shown). A clutch (first clutch) C-4, a clutch (second clutch) C-3, and a double-pinion planetary gear DP (which will be described in detail below) are arranged on the input shaft 5 in that order from a forward side to a rearward side. A gear mechanism (not shown) having, for example, a Ravigneaux type planetary gear unit or the like, is provided rearward of and coaxially with the input shaft 5. The gear mechanism has an output shaft that is connected thereto so as to output rotation to driving wheels. In this manner, the automatic transmission $1_1$ is structured so as to achieve the shifting of multiple speeds, for example, eight forward speeds and two reverse speeds.

Still further, in this specification, the term "clutch (and brake) is used in a meaning that includes friction plates (outer friction plates and inner friction plates) and a hydraulic servo for connecting and disconnecting the friction plates.

A forward portion of the automatic transmission $1_1$ in which a hydraulic servo 30 for a clutch C-4 (for use for a first clutch) is disposed will be described in detail with reference to FIG. 1. Inside a transmission case 3, a planetary gear DP is disposed on the input shaft 5. The planetary gear DP has a sun gear S1, a carrier CR1, and a ring gear R1. Among these gears, the sun gear S1 is integrally fixed to a sleeve member 50 that is fitted over an outer peripheral surface of the input shaft 5 and that extends forward. The sleeve member 50 is integrally fixed to an inner peripheral surface of a boss portion 3a that extends rearward (rightward in FIG. 1) from a radially inward side of a partition wall member provided forward of the transmission case 3. In short, the sun gear S1 is fixed so as to be unrotatable with respect to the transmission case 3.

The carrier CR1 has a rearward carrier plate CR1a and a forward carrier plate CR1b, and thereby supports pinions P1, P2 in an easily rotatable fashion. The pinions P1 and the pinions P2 mesh with each other. Furthermore, the pinions P1 mesh with the sun gear S1, and the pinions P2 mesh with the ring gear R1. The rearward carrier plate CR1a extends from the outer peripheral surface of the input shaft 5 to a radially outward side in the form of a flange. The forward carrier plate CR1b has an annular shape, and a hub member 49 is fastened thereto. The hub member 49 extends forward from an outer peripheral portion thereof. Inner friction plates 31b (described below) of the clutch C-4 are spline-mated with an outer peripheral surface of the hub member 49.

Inner friction plates 21b of a clutch C-3 (described below) are spline-mated with an outer peripheral surface of the ring gear R1. A generally circular plate shape support plate 51 (a part of which is not shown) is connected to a rearward end of the ring gear R1 so as to support the ring gear R1 on the input shaft 5. A drum member 52 of another clutch, for example, is connected to an outer peripheral side portion of the support plate 51, and the support plate 51 is connected to a gear of another planetary gear unit (not shown).

The clutch C-3 (second clutch) includes friction plates 21, that is, outer friction plates 21a and the inner friction plates 21*b*, and a hydraulic servo 20 for connecting and disconnecting the friction plates 21. The friction plates 21 are disposed on the outer peripheral side of the ring gear R1 as described above, and the hydraulic servo 20 is disposed on the boss portion 3*a* at a forward side of the planetary gear DP, specifically, at a forwardmost location within the transmission case 3. Thus, the clutch C-3 is provided in such a fashion that a clutch drum (a shaft member, a drum member) 22 of the clutch C-3 encloses the clutch C-4 and, more particularly, a clutch drum (cylinder member) 32 thereof.

The hydraulic servo 20 includes the clutch drum 22, a piston member 23, a cancel plate 24 and a return spring 25. These members define an operating oil chamber 26 and a cancel oil chamber 27. The clutch drum 22 has a flange portion 22*a* that extends from a radially inward side to a radially outward side, a drum portion (outer peripheral portion) 22*b* that extends from an outer periphery of the flange portion 22*a* to a location rearward of the substantially the entire body of the clutch C-3, and a hub portion 22*c* whose radially inward side is easily rotatably supported on the rearwardly extended boss portion 3*a*.

On a rearward side of the flange portion 22*a*, a cylinder portion 22*d* for defining the operating oil chamber 26 is formed at a site that faces the piston member 23. An outer peripheral surface of the hub portion 22*c* has a stepped shape having a plurality of steps, with its forward end side having a large diameter and its rearward end side having a small diameter. A rearward end of the hub portion 22*c* is located immediately forward of a forward end surface of the sun gear S1. In other words, the rearward end of the hub portion 22*c* reaches a location rearward of the hydraulic servo 30 of the clutch C-4.

The drum portion 22*b* of the clutch drum 22 extends past a radially outward side of the clutch C-4, and is connected to a gear of the planetary gear unit (not shown). A portion of the inner peripheral surface of the drum portion 22*b* which opposes the ring gear R1 is spline-mated (meshed) with the outer friction plates 21*a*. The clutch drum 22 further has a step portion 22*e* forward of a portion of the inner peripheral surface of the drum portion 22*b* which corresponds to the clutch C-4. The step portion 22*e* contacts the clutch drum (drum member) 32 of the clutch C-4.

A forward-side outer peripheral surface of the drum portion 22*b* is spline-mated with inner friction plates 41*b* of a brake B-1. Outer friction plates 41*a* of the brake B-1 are spline-mated with an inner peripheral surface of the transmission case 3. When the brake B-1 is actuated by a hydraulic servo (not shown), rotation of the clutch drum 22 stops.

The piston member 23 is disposed rearward of the flange portion 22*a* of the clutch drum 22 so that the piston member 23 faces the cylinder portion 22*d* and can be moved in forward and rearward directions. The piston member 23 and the clutch drum 22 form there between the operating oil chamber 26 in an oil-tight fashion due to two seal rings $a1$, $a2$. The piston member 23 has a drum portion 23*a* (see a lower part of FIG. 1) that extends at a rearward outer peripheral side. The drum portion 23*a* extends rearward in a space between an outer peripheral side of a drum portion 32*b* of the clutch drum 32 of the clutch C-4 described in detail below and an inner peripheral side of the drum portion 22*b* of the clutch drum 22 of the clutch C-3. A rearward end of the drum portion 23*a* faces the friction member 21.

A portion of an outer peripheral surface of the drum portion 32*b* of the clutch drum 32 and a portion of the inner peripheral surface of the drum portion 22*b* of the clutch drum 22 are spline-mated with each other via cutouts formed in a portion of the drum portion 23*a* (see a lower part of FIG. 1). The step portion 22*e* extends through cutouts formed in a portion of the drum portion 23*a*. That is, the step portion 22*e* is formed so as to have a shape of comb teeth. Furthermore, the drum portion 22*b* of the clutch drum 22 and the drum portion 23*a* of the piston member 23 are superimposed with each other in a circumferential direction. The step portion 22*e* can be formed together with the formation of splines in an inner peripheral surface of the drum portion 22*b* of the clutch drum 22. Therefore, the production process can be reduced as compared with the case where the splines and the step portion are separately formed.

Rearward movement of the cancel plate 24 is restricted by a snap ring 29 that is fitted to the hub portion 22*c*. Between the cancel plate 24 and the piston member 23 disposed forward thereof, the return spring 25 is disposed in a contracted state, and the cancel oil chamber 27 is configured in an oil-tight fashion due to a seal ring $a3$. The cancel plate 24 is always urged rearward on the basis of the spring force of the return spring 25 and the like. That is, the cancel plate 24 is fixed with respect to the clutch drum 22.

The clutch C-4 is disposed within the above-described clutch drum 22 of the clutch C-3, that is, forward of the planetary gear DP. The clutch C-4 includes friction plates 31, that is, outer friction plates 31*a* and inner friction plates 31*b*, and the hydraulic servo 30 for connecting and disconnecting the friction plates 31. The hydraulic servo 30 includes the clutch drum 32, that is, a cylinder member having a cylinder portion 32*d*, and also includes a piston member 33, a cancel plate 34 and a return spring 35. These members define an operating oil chamber 36 and a cancel oil chamber 37. The clutch drum 32 has a flange portion 32*a* that extends from a radially inward side to a radially outward side, and the drum portion 32*b* that extends rearward from an outer periphery of the flange portion 32*a*.

On a rearward side of the flange portion 32*a*, the cylinder portion 32*d* for defining the operating oil chamber 36 is formed at a site that faces the piston member 33, similarly to the above-described cylinder portion 22*d*. A forward side portion of an outer peripheral portion of the flange portion 32*a* of the clutch drum 32, that is, a forward side portion near a base portion of the drum portion 32*b*, contacts the step portion 22*e*. The drum portion 32*b* is located at the radially outward side of the hub member 49 fastened to the carrier CR1 of the planetary gear PD. An inner peripheral surface of the drum portion 32*b* is spline-mated with the outer friction members 31*a*. An outer peripheral side of the drum portion 32*b* is spline-mated with the clutch drum 22 of the clutch C-3 so as to prevent relative rotation therebetween.

Figure 4:
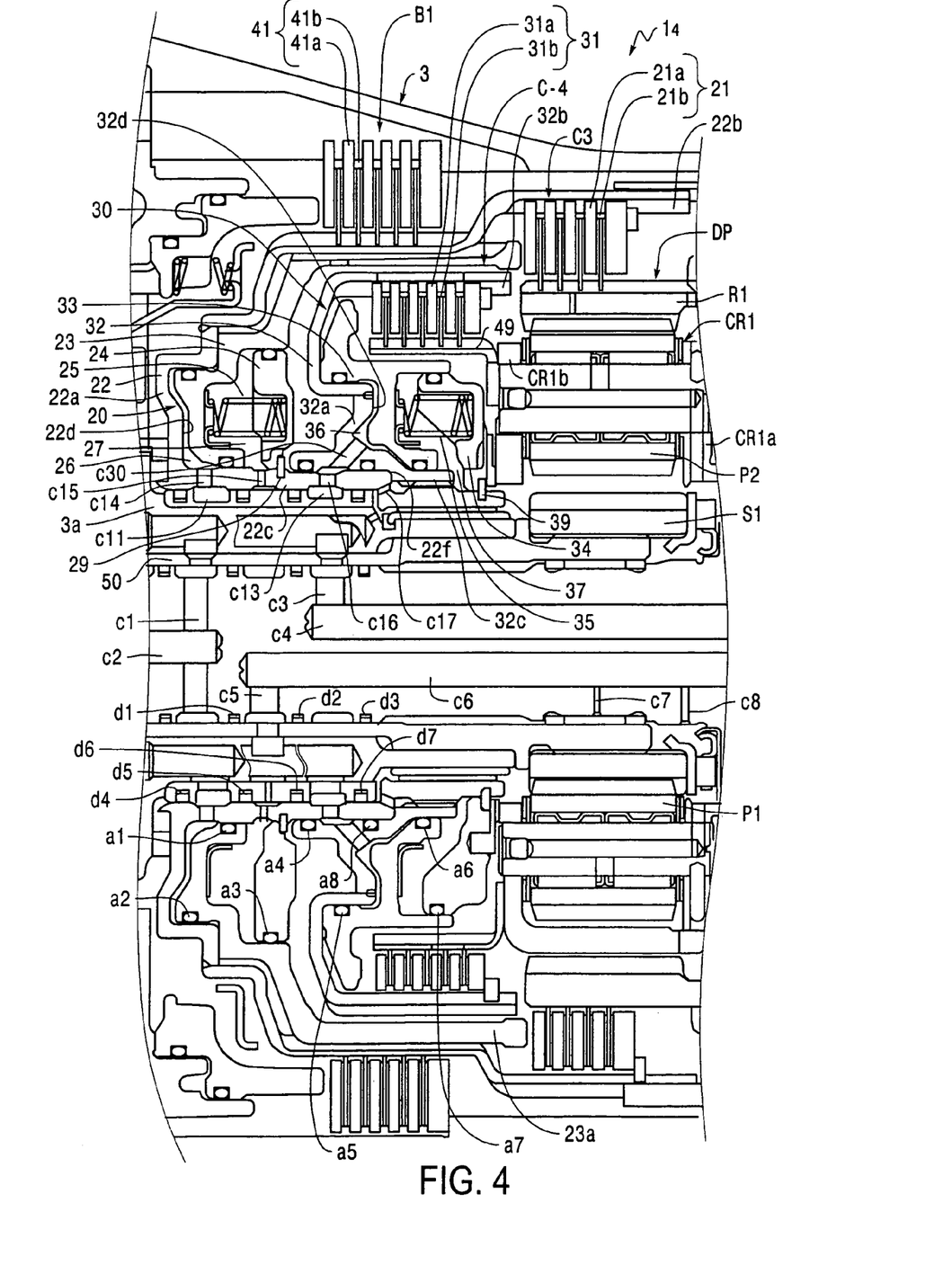
FIG. 4 is a sectional view showing a portion of an automatic transmission according to a fourth exemplary embodiment.

The piston member 33 is disposed at a rearward outer peripheral side of the flange portion 32*a* of the clutch drum 32 so that the piston member 33 faces the cylinder portion 32*d* of the clutch drum 32 and can be moved in forward and rearward directions. A gap between the clutch drum 32 and the clutch drum 22 is sealed by a seal ring $a4$. Likewise, a gap between the clutch drum 32 and the piston member 33 is sealed by a seal ring $a5$, and a gap between the clutch drum 22 and the piston member 33 is sealed by a seal ring $a6$. Thus, the operating oil chamber 36 is configured in an oil-tight fashion between the cylinder portion 32*d* of the clutch drum 32 and the piston member 33. The operating oil chamber 36 is supplied with an operating oil directly through an oil passage $c16$ (described below) of the clutch drum 22, without intervention of the clutch drum 32. Therefore, as compared with the case where the operating oil chamber is supplied with an operating oil via the clutch drum 32, the number of seal rings required can be reduced by one (e.g., the seal ring a8 in FIG. 4 is not necessary). Thus, the above-described structure allows a reduction in the number of component parts.

Rearward movement of the cancel plate 34 is restricted by a snap ring 39 that is fitted to the hub portion 22c. Disposed between the cancel plate 34 and the piston member 33 disposed forward thereof, is the return spring 35 in a contracted state, and the cancel oil chamber 37 is configured in an oil-tight fashion by a seal ring a7. The cancel plate 34 is always urged rearward on the basis of the spring force of the return spring 35. That is, the cancel plate 34 is fixed with respect to the clutch drum 22.

An oil passage structure of each composing element will next be described. As shown in FIG. 1, the input shaft 5 has oil passages c2, c4, c6 that are bored therein in an axial direction. The oil passage c2 is connected to an outer peripheral surface of the input shaft 5 via an oil passage c1 extending in a radial direction. Likewise, the oil passage c4 and the oil passage c6 are connected to the outer peripheral surface of the input shaft 5 via a radially extending oil passage c3 and a radially extending oil passage c5, respectively.

The boss portion 3a has oil passages c10, c11, c12, c13 which are bored in radial directions and which are arranged in that order starting at a forward side. The hub portion 22c of the clutch drum 22 of the clutch C-4, located at the outer peripheral side of the boss portion 3a, has oil passages c14, c15, c16, c17 which are arranged in that order starting at a forward side and which are bored so as to extend in radial directions. A portion of the sleeve member 50, formed integrally with the sun gear S1, which portion is just forward of the sun gear S1, has an oil passage c23 that is bored in a radial direction.

A forward outer peripheral side of the sleeve member 50 has an oil groove (not shown) which forms an oil passage between the sleeve member 50 and the boss portion 3a. In a broader sense, the oil passage is formed within the boss portion 3a (hereinafter, referred to as the "oil passage within the boss portion 3a"). The outer peripheral side of the input shaft 5 is provided with seal rings d1 to d3 and a seal ring (not shown) forward of the oil passage c1 in order to seal the oil passages c1, c3, c5 from a clearance of the boss portion 3a (the sleeve member 50). Furthermore, the outer peripheral side of the boss portion 3a is provided with seal rings d4, d5 for sealing the oil passage c11 of the boss portion 3a and the oil passage c14 of the hub portion 22c of the clutch drum 22, and seal rings d6, d7 for sealing the oil passage c13 of the boss portion 3a and the oil passage c16 of the hub portion 22c of the clutch drum 22.

The supply of a lubricating oil will next be described. For example, when the lubricating oil is supplied into the oil passage within the boss portion 3a on the basis of the oil pressure generated by an oil pump (not shown), the lubricating oil flies to an outer peripheral side of the boss portion 3a via the oil passages c10, c12. Furthermore, when the lubricating oil from the oil pump is supplied to the oil passage within the boss portion 3a, the lubricating oil is also supplied into the oil passages c5, c6 of the input shaft 5 in a sealed fashion due to the seal rings d1, d2. Therefore, the lubricating oil is supplied toward a rear side through the oil passage c6, and flies to an outer peripheral side of the input shaft 5 through oil passages c7, c8, c9. In this manner, lubrication is accomplished on various members within the transmission case 3, for example, the gears of the planetary gear DP as well as the members of the clutch C-3, the members of the clutch C-4 and the members of the brake B-1 and, in particular, the friction plates 21, 31, 41.

The oil within the cancel oil chambers 27, 37 of the clutch C-3 and the clutch C-4, respectively, is supplied through the oil passages c15, c17 in the same manner as described above with regard to the lubricating oil. The oil discharged from the chambers joins the flow of lubricating oil, and lubricates various members within the transmission case 3.

The supply of the operating oil will next be described. For example, on the basis of the oil pressure generated by an oil pump (not shown), an oil pressure control device (not shown) performs an oil pressure control of the engaging oil pressures on the clutch C-3, the clutch C-4, the brake B-1 and a lockup clutch (not shown), etc. Then, on the basis of the engaging oil pressure of each of the lockup clutch, the clutch C-3 and the clutch C-4, the operating oil is supplied to the oil passages separately provided within the boss portion 3a (within the first sleeve member 50) from a forward root portion of the boss portion 3a.

When the operating oil for engaging the lockup clutch is supplied to the oil passage within the boss portion 3a, the operating oil is supplied from the oil passage within the boss portion 3a to the oil passage c1 in a sealed fashion due to the seal ring d1 and the seal ring (not shown). After being supplied to the oil passage c1, the operating oil is supplied to the friction plates of the lockup clutch through the oil passage c2, and acts on the friction plates so as to engage the lockup clutch. When the lockup clutch is to be released on the basis of the oil pressure control of the oil pressure control device, the operating oil is discharged from the lockup clutch through the oil passages c2, c1.

When the operating oil for engaging the clutch C-3 is supplied to the oil passage within the boss portion 3a, the operating oil is supplied therefrom to the oil passage c11 of the boss portion 3a through an oil passage (not shown) extending in the axial direction within the boss portion 3a. After being supplied to the oil passage c11, the operating oil is supplied to the oil passage c14 in a sealed fashion due to the seal rings d4, d5. Specifically, oil is supplied from the oil passage c11 of the boss portion 3a to the oil passage c14 of the clutch drum 22, which is relatively rotatable with respect to the boss portion 3a. Then, the operating oil is supplied, via the oil passage c14, to the operating oil chamber 26 of the hydraulic servo 20 of the clutch C-3, so that the piston member 23 is pressed rearward and the drum portion 23a presses the friction plates 21, that is, the clutch C-3 is engaged. When the clutch C-3 is to be released on the basis of the oil pressure control of the oil pressure control device, the piston member 23 is pressed forward by the spring force of the return spring 25, so that the operating oil in the operating oil chamber 26 is discharged through the oil passages c14, c11, and the oil passage extending in the axial direction within the boss portion 3a.

When the operating oil for engaging the clutch C-4 is supplied to the oil passage within the boss portion 3a, the operating oil is supplied therefrom to the oil passage c13 through an oil passage (not shown) extending in the axial direction within the boss portion 3a. After being supplied to the oil passage c13, the operating oil is supplied to the oil passage c16 in a sealed fashion due to the seal rings d6, d7, specifically, supplied from the oil passage c13 of the boss portion 3a to the oil passage c16 of the clutch drum 22, which is relatively rotatable with respect to the boss portion 3a. Then, the operating oil is supplied, via the oil passage c16, to the operating oil chamber 36 of the hydraulic servo 30 of the clutch C-4, so that the piston member 33 is pressed rearward, and presses the friction plates 31, that is, the clutch C-4 is engaged. When the clutch C-4 is to be released on the basis of the oil pressure control of the oil pressure control device, the piston member 33 is pressed forward by the spring force of the return spring 35, so that the operating oil in the operating oil chamber 36 is discharged through the oil passages c16, c13, and the oil passage extending in the axial direction within the boss portion 3a.

A relationship of the forces that act on the clutch drum 32 of the hydraulic servo 30 of the clutch C-4 will next be described in accordance with operations of the automatic transmission $1_1$. For example, when rotation (drive power) is input to the input shaft 5 on the basis of rotation of the engine, the carrier CR1 undergoes the same rotation as the rotation of the input shaft 5 (hereinafter, referred to as "input rotation"). The sun gear S1 is fixed in rotation with respect to the transmission case 3 via the boss portion 3a as described above. Due to the fixed sun gear S1 and the carrier CR1 undergoing the same rotation as the input rotation, the ring gear R1 rotates at a speed that is lower than the speed of the input rotation.

When the brake B-1 is in an actuated state and the clutch C-3 and the clutch C-4 are in a released state on the basis of the oil pressure control of the oil pressure control device (not shown), rotation of the clutch drum 22 of the clutch C-3 is fixed by the brake B-1. Then, the clutch drum 32, the piston member 33 and the cancel plate 34 of the clutch C-4 and the like within the clutch drum 22 (on the hub portion 22c) are stopped from rotation, that is, rotation of the entire hydraulic servo 30 is fixed. Because the outer peripheral side of the clutch drum 32 is spline-mated with the inner peripheral side of the clutch drum 22, the clutch drums 32, 22 always undergo the same rotation.

During this state, because the hydraulic servo 30 does not rotate, centrifugal force does not act on the operating oil chamber 36 and the cancel oil chamber 37. Furthermore, during this state, the clutch C-4 is not engaged, that is, the piston member 33 is in contact with the flange portion 32a of the clutch drum 32. During this state, the spring force of the return spring 35 (termed "Fsp") is transferred to the clutch drum 32 via the piston member 33. Therefore, the clutch drum 32 is pressed against the step portion 22e of the clutch drum 22, and is thus fixed thereon.

Incidentally, a mathematical expression of "F=Fsp>0" holds, where "F" is the force that acts on the clutch drum 32 in a direction toward the step portion 22e (forward direction).

When the brake B-1 and the clutch C-4 are in the released state and the clutch C-3 is in the engaged state on the basis of the oil pressure control of the oil pressure control device (not shown), the reduced-speed rotation of the ring gear R1 is input to the clutch drum 22 via the friction plates 21 of the clutch C-3. Then, the rotation of the entire hydraulic servo 30 disposed within the clutch drum 22 (on the hub portion 22c) also becomes a reduced-speed rotation.

During this state, because the hydraulic servo 30 undergoes reduced-speed rotation, centrifugal force occurs in the operating oil chamber 36 and the cancel oil chamber 37. Furthermore, the clutch C-4 is not engaged, that is, the piston member 33 is in contact with the flange portion 32a of the clutch drum 32. During this state, the spring force of the return spring 35 (referred to as "Fsp") is transferred to the clutch drum 32 via the piston member 33. Due to the centrifugal force acting on the oil in the cancel oil chamber 37, centrifugal oil pressure occurs in the cancel oil chamber 37. The force of the centrifugal oil pressure (referred to as "Fc") within the cancel oil chamber 37 is transferred to the clutch drum 32 via the piston member 33 to receive a reaction force from the cancel plate 34 and the snap ring 39. Furthermore, due to the centrifugal force acting on the oil in the operating oil chamber 36, centrifugal oil pressure occurs in the operating oil chamber 36. The centrifugal oil pressure causes a force (referred to as "Fp") that acts on the piston member 33 in a direction opposite to the direction to the clutch drum 32 (in a rearward direction), and a force (referred to as "Fd") that presses the clutch drum 32 forward.

Incidentally, the force F that acts on the clutch drum 32 in the direction to the step portion 22e (forward direction) can be mathematically expressed as "F=Fd−Fp+Fc+Fsp". Furthermore, the force that presses the piston member 33 toward the clutch drum 32 in order to maintain the released state of the clutch C-4, that is, the force that acts on the piston member 33 in order to secure a canceling performance, has a relationship of Fc+Fsp≦Fp. Therefore, F>0 holds, so that the clutch drum 32 is pressed and fixed to the step portion 22e of the clutch drum 22.

For example, when the brake B-1 and the clutch C-3 are in the released state and the clutch C-4 is in the engaged state on the basis of the oil pressure control of the oil pressure control device (not shown), the input rotation of the carrier CR1 is input to the clutch drum 32 via the friction plates 31 of the clutch C-4, and the input rotation is also input to the clutch drum 22 that is spline-mated with the clutch drum 32. As a result, the rotation of the entire hydraulic servo 30 disposed in the clutch drum 22 (on the hub portion 22c) also becomes equal to the input rotation.

In this case, as the hydraulic servo 30 undergoes the input rotation, centrifugal forces greater than those occurring during the aforementioned reduced-speed rotation state occur in the operating oil chamber 36 and the cancel oil chamber 37. Furthermore, because the clutch C-4 is in the engaged state, the operating oil chamber 36 is supplied with the engaging oil pressure. Therefore, the piston member 33 and the cylinder portion 32d of the clutch drum 32 are apart from each other, but the force acting on the piston member 33 is transferred to the clutch drum 32 via the oil within the oil-tight operating oil chamber 36.

During this state, the spring force of the return spring 35 and centrifugal oil pressure caused by centrifugal force that occurs in the oil within the operating oil chamber 36 and the oil within the cancel oil chamber 37 act similarly to the engaged state of the clutch C-3. The spring force of the return spring 35 (referred to as "Fsp") is transferred to the clutch drum 32 via the piston member 33 and the oil present within the operating oil chamber 36. Furthermore, due to the centrifugal force acting on the oil in the cancel oil chamber 37, a centrifugal oil pressure that is greater than the centrifugal oil pressure during the aforementioned reduced-speed rotation state occurs in the cancel oil chamber 37. Therefore, the force of the centrifugal oil pressure (referred to as "Fc") of the cancel oil chamber 37 is transferred to the clutch drum 32 via the piston member 33 and the oil of the operating oil chamber 36 to receive a reaction force from the cancel plate 34 and the snap ring 39.

Due to the centrifugal force acting on the oil in the operating oil chamber 36, centrifugal oil pressure occurs in the operating oil chamber 36. The centrifugal oil pressure causes a force (referred to as "Fp") that acts on the piston member 33 in a direction opposite to the direction to the clutch drum 32 (in the rearward direction), and a force (referred to as "Fd") that presses the clutch drum 32 forward. Furthermore, when the engaging oil pressure for engaging the clutch C-4 is supplied into the operating oil chamber 36 and therefore the clutch C-4 is engaged, the piston member 33 presses the friction plates 31. Then, the engaging oil pressure acts on the clutch drum 32 via the piston member 33, the friction plates 31, and a snap ring that restricts the movement of the friction plates 31, producing a force (referred to as "Fp'") that acts on the clutch drum 32 in a direction toward the piston member 33 (in the rearward direction). Naturally, the engaging oil pressure also produces a force (referred to as "Fd'") that directly presses the clutch drum 32 forward.

The force F that acts on the clutch drum 32 in the direction of the step portion 22e (the forward direction) can be mathematically expressed as "F=Fd'−Fp'+Fd−Fp+Fc+Fsp". The force that presses the piston member 33 toward the clutch drum 32 in order to maintain the released state of the clutch C-4, that is, the force that acts on the piston member 33 in order to secure the canceling performance, has a relationship of "Fc+Fsp≧Fp". Fd'−Fp'≈0 is achieved by reducing the step (elevation difference) between a radially inward side seal portion of the clutch drum 32 and a radially inward side seal portion of the piston member 33, that is, by reducing the difference between the pressure receiving area of the clutch drum 32 in the operating oil chamber 36 and the pressure receiving area of the piston member 33 in the operating oil chamber 36. Therefore, F>0 holds, so that the clutch drum 32 is pressed and fixed to the step portion 22e of the clutch drum 22.

For example, during a state where the clutch C-4 and the clutch C-3 are released and the brake B-1 is released on the basis of the oil pressure control of the oil pressure control device (not shown), the clutch drum 22 and the hydraulic servo 30 are in a free rotation state with respect to the planetary gear DP, but can assume, for example, a rotation stopped state or a following rotation state, depending on the states of rotation of various gears of another planetary gear unit (not shown).

During the state where the clutch drum 22 and the hydraulic servo 30 are stopped from rotation, a force similar to the force occurring during the aforementioned state where the brake B-1 is actuated acts on the clutch drum 32. During the state where the clutch drum 22 and the hydraulic servo 30 rotate following the rotation of another member, substantially the same relationship of forces occurs despite a variation in the centrifugal force (centrifugal oil pressure) dependent on the rotation speed, as compared with the aforementioned state where the clutch C-3 is engaged. Therefore, the clutch drum 32 is pressed and fixed to the step portion 22e of the clutch drum 22.

In some cases, the lubricating oil is supplied into and resides in a space between the clutch drum 32 and the cancel plate 24, via the inner peripheral side of the cancel plate 24 of the hydraulic servo 20 of the clutch C-3 (e.g., via the oil passage c15). If, during this state, the clutch drum 22 undergoes rotation (input rotation, reduced-speed rotation, following rotation, etc.), the centrifugal oil pressure caused in the lubricating oil may produce a force that presses the clutch drum 32 rearward. Furthermore, for example, when the clutch C-4 becomes engaged, a force that presses the clutch drum 32 rearward may sometimes be produced as the friction plates 31 are pressed rearward by the piston member 33 while being rotated by the carrier CR1.

However, the aforementioned force that presses the clutch drum 32 rearward is very small compared with the spring force of the return spring 35 and the forces caused by the centrifugal oil pressures in the operating oil chamber 36 and the cancel oil chamber 37. Therefore, despite this rearward force, the clutch drum 22 is not pressed and moved rearward.

According to the above-described clutch-purpose hydraulic servo 30 of the first exemplary embodiment, the clutch drum (i.e., cylinder member) 32 having the cylinder portion 32d is a separate body from the cancel plate 34 and both are disposed on the hub portion 22c of the clutch drum 22 that undergoes the same rotation as the clutch drum 32. The step portion 22e prevents the clutch drum 32 only from movement to a side opposite from the cancel plate 34 in an axial direction, relative to the clutch drum 22. The movement of the clutch drum 32 to a side of the cancel plate 34 in the axial direction is restricted by such an arrangement that the force that presses the clutch drum 32 to the step portion 22e side is always greater than the force that presses the clutch drum 32 to the cancel plate 34 side because of the spring force of the return spring 35, the oil pressure in the cancel oil chamber 37 and the oil pressure in the operating oil chamber 36. Therefore, the above-described structure allows the clutch drum 32 to be a separate member from the clutch drum 22 and be pressed and fixed to the step portion 22e side, and allows elimination of the process of integrating the clutch drum 32 and the clutch drum 22, for example, by a welding process or the like, while facilitating a compact design as compared with, for example, a structure where the cancel plate 34 is provided on a hub-shaped member that extends at an inner peripheral side of the clutch drum 32. Therefore, the clutch-purpose hydraulic servo 30 of the first embodiment allows improvement in the ease of assembly and a reduction in production processes and costs.

Due to the provision of the seal ring a4 that seals the gap between the clutch drum 22 and the clutch drum 32, the oil in the operating oil chamber 36 can be sealed in. Therefore, although the clutch drum 22 and the clutch drum 32 are provided as separate members, the operating oil chamber 36 can be formed. That is, it becomes possible to provide the clutch drum 22 and the clutch drum 32 as separate members.

Furthermore, the clutch drum 32 of the clutch C-4 is enclosed within the clutch drum 22 that meshes with the friction plates 21 of the clutch C-3, and the member on which the cancel plate 34 and the clutch drum 32 are disposed is the clutch drum 22 of the clutch C-3. Therefore, the embodiment can be employed for a structure where two clutches are disposed within a clutch drum as described above.

Still further, the cylinder member is formed by the clutch drum 32 whose drum portion 32b is spline-mated, on the inner peripheral side thereof, with the friction plates 31, and the clutch drum 32 is spline-mated with the clutch drum 22 of the clutch C-3 in such a fashion that the clutch drum 32 is not rotatable relative to the clutch drum 22. Therefore, the clutch C-4 can be structured without the need to form the clutch drum 22 of the clutch C-3 in a complicated configuration (see FIG. 3).

The device employed for restricting the forward movement of the clutch drum 32 is merely the step portion 22e formed on the inner peripheral side of the clutch drum 22 of the clutch C-3. Thus, the restriction of forward movement of the clutch drum 32 can be achieved without the need to attach other members. It therefore becomes possible to improve the ease of assembly and reduce the production processes and costs.

Furthermore, the step portion 22e is formed on the inner peripheral side of the drum portion 22b of the clutch drum 22 of the clutch C-3. Therefore, for example, when the splines for spline-mating the clutch drum 22 of the clutch C-3 and the clutch drum 32 of the clutch C-4 are formed on the inner peripheral side of the drum portion 22b of the clutch drum 22 and the outer peripheral side of the clutch drum 32, the step portion 22e can simultaneously be formed. Thus, the production process can be reduced.

As the clutch-purpose hydraulic servo 30 is used in the vehicular automatic transmission 1₁, it becomes possible to improve the ease of assembly of the vehicular automatic transmission $1_1$ and reduce the production processes and costs thereof.

Although in the first embodiment, the step portion 22e is provided on the inner peripheral side of the drum portion 22b of the clutch drum 22, that is, contacts the outer peripheral side of the clutch drum 32, the step portion 22e may instead be provided at an outer peripheral side of the hub portion 22c of the clutch drum 22, that is, at an inner peripheral side of the clutch drum 32.

Figure 2:
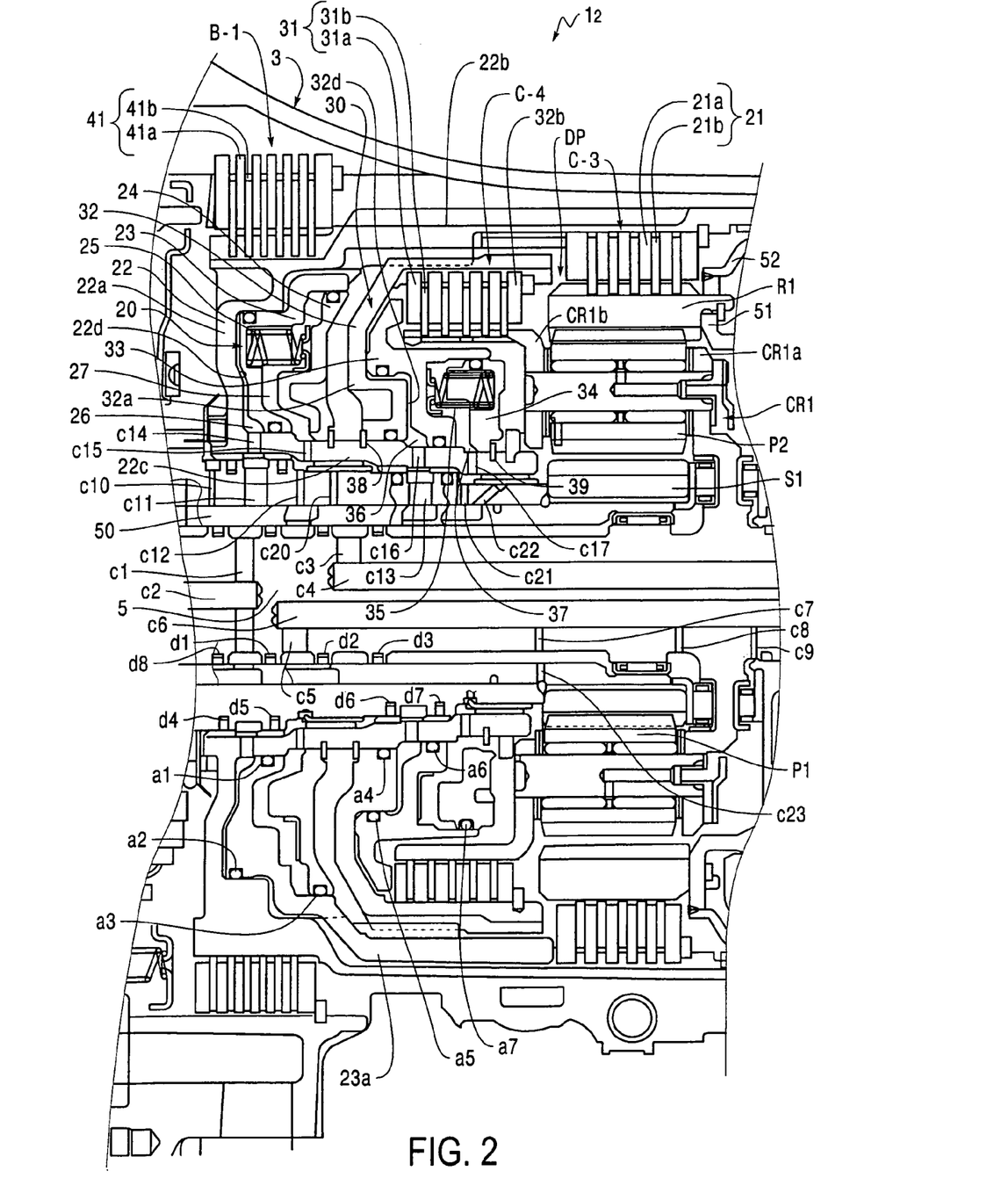
FIG. 2 is a sectional view showing a portion of an automatic transmission according to a second exemplary embodiment.

A second exemplary embodiment, that is partially changed from the first embodiment, will be described with reference to FIG. 2. FIG. 2 is a sectional view showing a portion of an automatic transmission $1_2$ according to the second embodiment. The automatic transmission $1_2$ of the second embodiment described below has substantially the same structure as the automatic transmission $1_1$ of the first embodiment. Portions of the second embodiment comparable to those of the first embodiment are represented by comparable reference characters in FIG. 2, and will not be described below. Only the different portions will be described below.

In the second embodiment, the device for restricting the forward movement of the clutch drum (cylinder member) 32 provided with the cylinder portion 32d is not the step portion 22e of the clutch drum 22, but is a snap ring 38 provided on an outer peripheral side of the hub portion 22c of the clutch drum 22.

The forward carrier plate CR1b of the carrier CR1 extends forward, and is spline-mated with the inner friction plates 31b of the clutch C-4 (i.e., the forward carrier plate CR1b and the hub member 49 in the first embodiment are formed integrally as a unit). Furthermore, as oil passages for supplying the lubricating oil from the oil passage within the boss portion 3a (within the sleeve member 50), oil passages c20, c21, c22 are bored in the boss portion 3a.

Thus, the snap ring 38 restricts forward movement of the clutch drum 32 with respect to the clutch drum 22. Furthermore, similar to the first embodiment, the second embodiment is structured so that the force that presses the clutch drum 32 to the snap ring 38 side is always greater than the force that presses the clutch drum 32 to the cancel plate 34 side on the basis of the spring force of the return spring 35, the oil pressure in the cancel oil chamber 37 and the oil pressure in the operating oil chamber 36.

According to the above-described clutch-purpose hydraulic servo 30 of the second embodiment, the clutch drum 32 is a separate body from the cancel plate 34 and both are disposed on the hub portion 22c of the clutch drum 22 that undergoes the same rotation as the clutch drum 32. The snap ring 38 prevents the clutch drum 32 from movement to a side opposite from the cancel plate 34 in an axial direction, relative to the clutch drum 22. The movement of the clutch drum 32 to a side of the cancel plate 34 in the axial direction is restricted by such an arrangement that the force that presses the clutch drum 32 to the snap ring 38 side is always greater than the force that presses the clutch drum 32 to the cancel plate 34 side on the basis of the spring force of the return spring 35, the oil pressure in the cancel oil chamber 37 and the oil pressure in the operating oil chamber 36. Therefore, the above-described structure allows the clutch drum 32 to be a separate member from the clutch drum 22 and be pressed and fixed to the snap ring 38 side, and therefore allows elimination of the process of integrating the clutch drum 32 and the clutch drum 22, for example, a welding process or the like, while facilitating a compact design as compared with, for example, a structure where the cancel plate 34 is provided on a hub-shaped member that extends at an inner peripheral side of the clutch drum 32. Therefore, the clutch-purpose hydraulic servo 30 of the second embodiment allows improvement in the ease of assembly and a reduction in the production processes and costs.

Due to the provision of the seal ring a4 that seals the gap between the clutch drum 22 and the clutch drum 32, the oil in the operating oil chamber 36 can be sealed in. Therefore, although the clutch drum 22 and the clutch drum 32 are provided as separate members, the operating oil chamber 36 can be formed. That is, it becomes possible to provide the clutch drum 22 and the clutch drum 32 as separate members.

Furthermore, the clutch drum 32 of the clutch C-4 is enclosed within the clutch drum 22 that meshes with the friction plates 21 of the clutch C-3, and the member on which the cancel plate 34 and the clutch drum 32 are disposed is the clutch drum 22 of the clutch C-3. Therefore, the embodiment can be employed for a structure where two clutches are disposed within a clutch drum as described above.

Still further, the cylinder member is formed by the clutch drum 32 whose drum portion 32b is spline-mated, on the inner peripheral side thereof, with the friction plates 31, and the clutch drum 32 is spline-mated, on the outer peripheral side, with the clutch drum 22 of the clutch C-3 in such a fashion that the clutch drum 32 is not rotatable relative to the clutch drum 22. Therefore, the clutch C-4 can be structured without the need to form the clutch drum 22 of the clutch C-3 in a complicated configuration (see FIG. 3 described below).

The device employed for restricting the forward movement of the clutch drum 32 is merely the snap ring 38 fastened to the clutch drum 22. Therefore, what is required is a relatively easy process of merely attaching a snap ring. Thus, it becomes possible to improve the ease of assembly and reduce the production process and the production cost.

As the clutch-purpose hydraulic servo 30 is used in the vehicular automatic transmission $1_2$, it becomes possible to improve the ease of assembly of the vehicular automatic transmission $1_2$ and reduce the production processes and costs thereof.

Figure 3:
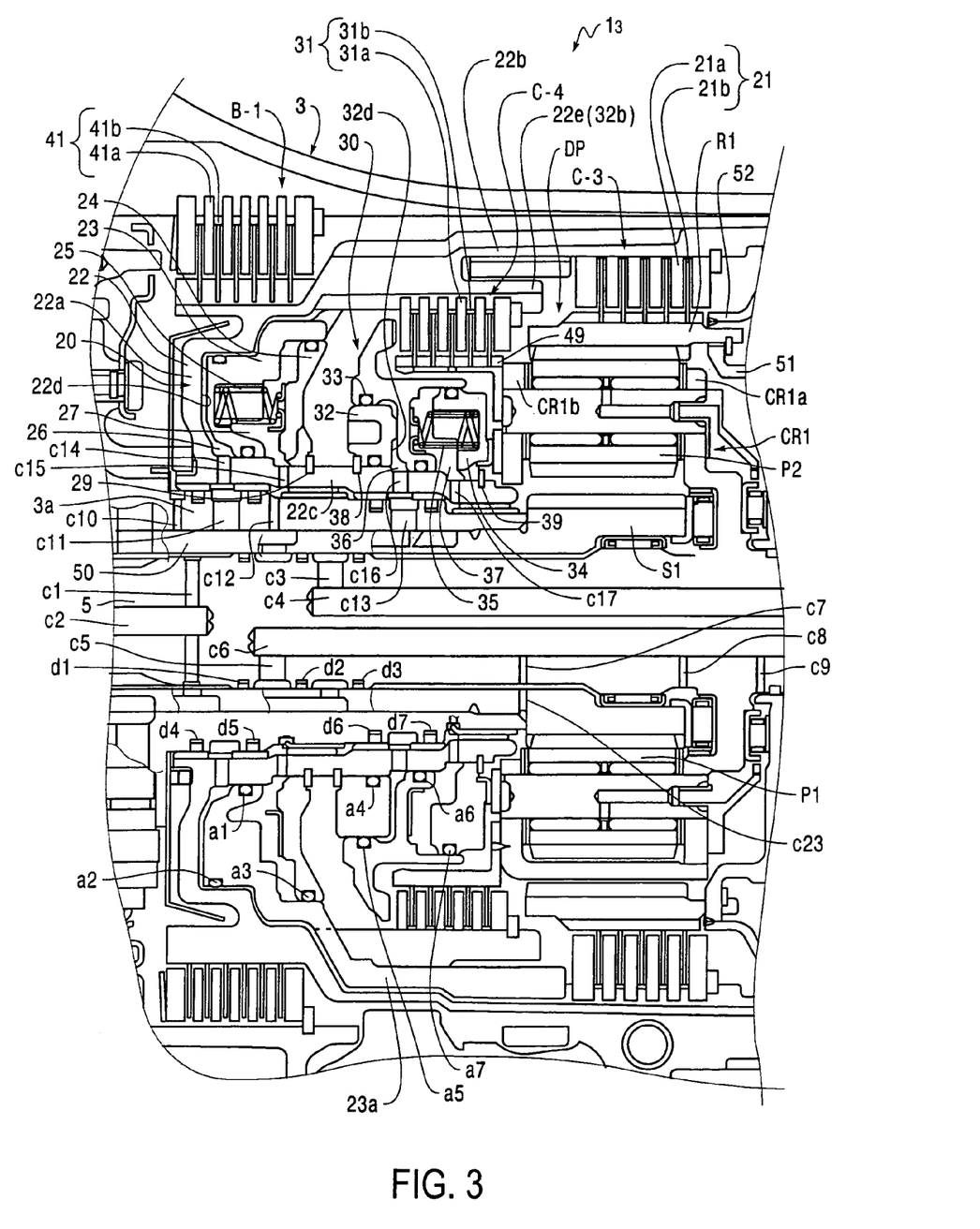
FIG. 3 is a sectional view showing a portion of an automatic transmission according to a third exemplary embodiment.

A third exemplary embodiment partially changed from the first and second embodiments will next be described with reference to FIG. 3. FIG. 3 is a sectional view showing a portion of an automatic transmission $1_3$ according to the third embodiment. The automatic transmission $1_3$ of the third embodiment described below has substantially the same structure as the automatic transmissions $1_1$, $1_2$ of the first and second embodiments. Portions of the third embodiment comparable to those of the first and second embodiments are represented by comparable reference characters in FIG. 3, and will not be described below. Only the different portions will be described below.

In the third embodiment, the friction plates 31 of the clutch C-4 are not connected for actuation to the cylinder member 32, but are directly spline-mated with the clutch drum 22 of the clutch C-3. That is, the drum portion 22e (32b) of the clutch drum of the clutch C-4 in the first and second embodiments is formed as an integral portion of the clutch drum 22 of the clutch C-3.

Specifically, the clutch drum 22 of the clutch C-3 has, on its outermost peripheral side, a first drum portion 22b whose inner peripheral side is spline-mated with the friction plates 21 of the clutch C-3. The clutch drum 22 further has a second drum portion 22e that is located forward of and slightly radially inward of the drum portion 22b. An inner peripheral side of the second drum portion 22e is splinemated with the friction plates 31 of the clutch C-4. That is, the first drum portion 22b and the second drum portion 22e substantially form a double structure. In short, the second drum portion 22e of the clutch drum 22 serves as a clutch drum of the clutch C-4, similar to the drum portion 32b of the clutch drum 32 described in the first and second embodiments.

In a space located on an inner peripheral side of the first drum portion 22b and an outer peripheral side of the second drum portion 22e, that is, between the drum portion 22b and the second drum portion 22e, the comb tooth-shaped drum portion 23a extending from the piston member 23 of the hydraulic servo 20 of the clutch C-3 is disposed in such a fashion as to extend through a space on an inner peripheral side of the spline-shaped clutch drum 22. A rearward end of the drum portion 23a faces the friction member 21.

The cylinder member 32 provided with the cylinder portion 32d does not form a clutch drum of the clutch C-4, but is merely a member that forms the cylinder portion 32d. Furthermore, the device for restricting forward movement of the cylinder member 32 is not the step portion 22e of the clutch drum 22 described in conjunction with the first embodiment, but is the snap ring 38 provided on the outer peripheral side of the hub portion 22c of the clutch drum 22 as in the second embodiment.

A relationship of forces that act on the cylinder member 32 of the hydraulic servo 30 of the clutch C-4 will be described only with regard to states that are different from those in the first and second embodiments.

For example, if the brake B-1 and the clutch C-3 are in the released state and the clutch C-4 is in the engaged state on the basis of an oil pressure control performed by an oil pressure control device (not shown), the input rotation of the carrier CR1 is input to the clutch drum 22 via the friction plates 31 of the clutch C-4. As a result, the rotation of the entire hydraulic servo 30 disposed in the clutch drum 22 (on the hub portion 22c) also becomes equal to the input rotation.

In this case, because the hydraulic servo 30 undergoes the input rotation, centrifugal forces greater than those occurring during the reduced-speed rotation state occur in the operating oil chamber 36 and the cancel oil chamber 37. Furthermore, as the clutch C-4 is in the engaged state, the operating oil chamber 36 is supplied with the engaging oil pressure. Therefore, the piston member 33 and the cylinder member 32 of the clutch drum 32 are apart from each other, but the force acting on the piston member 33 is transferred to the clutch drum 32 via the oil within the oil-tight operating oil chamber 36.

During this state, the spring force of the return spring 35 and centrifugal oil pressure caused by centrifugal force occurs in the oil within the operating oil chamber 36 and the oil within the cancel oil chamber 37 act. The spring force of the return spring 35 (referred to as "Fsp") is transferred to the cylinder member 32 via the piston member 33 and the oil present within the operating oil chamber 36. Furthermore, due to the centrifugal force acting on the oil in the cancel oil chamber 37, a centrifugal oil pressure that is greater than the centrifugal oil pressure during the aforementioned reduced-speed rotation state occurs in the cancel oil chamber 37. Therefore, the force of the centrifugal oil pressure (referred to as "Fc") of the cancel oil chamber 37 is transferred to the cylinder member 32 via the piston member 33 and the oil of the operating oil chamber 36 in such a fashion as to receive a reaction force with respect to the cancel plate 34 and the snap ring 39.

Due to the centrifugal force acting on the oil in the operating oil chamber 36, centrifugal oil pressure occurs in the operating oil chamber 36. The centrifugal oil pressure causes a force (referred to as "Fp") that acts on the piston member 33 in a direction opposite to the direction to the cylinder member 32 (in the rearward direction), and a force (referred to as "Fd") that presses the cylinder member 32 forward. Naturally, the engaging oil pressure also produces a force (referred to as "Fd'") that directly presses the clutch drum 32 forward. Furthermore, unlike the first and second embodiments, when the clutch C-4 is engaged, with the piston member 33 pressing the friction plates 31, the force of the engaging oil pressure of the operating oil chamber 36, transferred via the piston member 33, the friction plates 31 and the snap ring that restricts movement of the friction plates 31 (i.e., the aforementioned force "Fp'") acts on the clutch drum 22, and does not act on the cylinder member 32.

Therefore, the force F that acts on the cylinder member 32 in the direction toward the snap ring 38 (the forward direction) can be mathematically expressed as "F=Fd'+Fd−Fp+Fc+Fsp". The force that presses the piston member 33 to the cylinder member 32 side in order to maintain the released state of the clutch C-4, that is, the force that acts on the piston member 33 in order to secure the canceling performance, has a relationship of "Fc+Fsp≧Fp". Therefore, F>0 holds, so that the cylinder member 32 is pressed and fixed to the snap ring 38.

The relationships of forces that act on the cylinder member 32 during other states, that is, the relationships of such forces in the case where the clutch C-3 is engaged, the case where the brake B-1 is fastened, and the case where the clutch C-3, the clutch C-4 and the brake B-1 are released so that the free rotation state is attained, are substantially the same as the relationship of the forces that act on the clutch drum 32 in the first and second embodiments.

Furthermore, for example, even if the lubricating oil is supplied into a space between the cylinder plate 32 and the cancel plate 24, via the inner peripheral side of the cancel plate 24 of the hydraulic servo 20 of the clutch C-3 (e.g., via the oil passage c15), the lubricating oil does not reside solely where introduced but flows toward the second drum portion 22e of the clutch drum 22. Therefore, a force that presses the cylinder member 32 in a rearward direction does not occur.

Thus, similar to the first and second embodiments, the third embodiment is structured so that the force that presses the cylinder member 32 to the snap ring 38 side is always greater than the force that acts on the cylinder member 32 to press the cylinder member 32 to the cancel plate 34 side on the basis of the spring force of the return spring 35, the oil pressure of the cancel oil chamber 37 and the oil pressure of the operating oil chamber 36.

According to the above-described clutch-purpose hydraulic servo 30 of the third embodiment, the cylinder member 32 is a separate body from the cancel plate 34 and both are disposed on the hub portion 22c of the clutch drum 22 that undergoes the same rotation as the cylinder member 32. The snap ring 38 prevents the cylinder member 32 from only the movement to a side opposite from the cancel plate 34 in an axial direction, relative to the clutch drum 22. The movement of the cylinder member 32 to a side of the cancel plate 34 in the axial direction is restricted by such an arrangement that the force that presses the cylinder member 32 to the snap ring 38 side is always greater than the force that presses the cylinder member 32 to the cancel plate 34 side on the basis of the spring force of the return spring 35, the oil pressure in the cancel oil chamber 37 and the oil pressure in the operating oil chamber 36. Therefore, the above-described structure allows the cylinder member 32 to be a separate member from the clutch drum 22 and be pressed and fixed to the snap ring 38 side, and therefore allows elimination of the process of integrating the cylinder member 32 and the clutch drum 22, for example, a welding process or the like, while facilitating a compact design as compared with, for example, a structure where the cancel plate 34 is provided on a hub-shaped member that extends at an inner peripheral side of the cylinder member 32. Therefore, the clutch-purpose hydraulic servo 30 of the third embodiment allows improvement in the ease of assembly and reduction of the production processes and costs.

Due to the provision of the seal ring a4 that seals the gap between the clutch drum 22 and the cylinder member 32, the oil in the operating oil chamber 36 can be sealed in. Therefore, although the clutch drum 22 and the cylinder member 32 are provided as separate members, the operating oil chamber 36 can be formed. That is, it becomes possible to provide the clutch drum 22 and the cylinder member 32 as separate members.

Furthermore, the cylinder member 32 of the clutch C-4 is enclosed within the clutch drum 22 that meshes with the friction plates 21 of the clutch C-3, and the member on which the cancel plate 34 and the cylinder member 32 are disposed is the clutch drum 22 of the clutch C-3. Therefore, the embodiment can be employed for a structure where two clutches are disposed within a clutch drum as described above.

Still further, because the friction plates 31 are not connected for actuation to the cylinder member 32 of the clutch C-4, but are directly spline-mated with the clutch drum 22 of the clutch C-3, the clutch C-4 can be formed without provision of a clutch drum for the clutch C-4, and a compact design of the clutch C-4 can be achieved.

The device employed for restricting the forward movement of the cylinder member 32 is merely the snap ring 38 fastened to the clutch drum 22. Therefore, what is required is a relatively easy process of merely attaching a snap ring. Thus, it becomes possible to improve the ease of assembly and reduce the production processes and costs.

As the clutch-purpose hydraulic servo 30 is used in the vehicular automatic transmission $1_3$, it becomes possible to improve the ease of assembly of the vehicular automatic transmission $1_3$ and reduce the production processes and costs thereof.

A fourth exemplary embodiment that is partially changed from the first embodiment will be described with reference to FIG. 4. FIG. 4 is a sectional view showing a portion of an automatic transmission $1_4$ according to the fourth embodiment. The automatic transmission $1_4$ of the fourth embodiment described below has substantially the same structure as the automatic transmission $1_1$ of the first embodiment. Portions of the fourth embodiment comparable to those of the first embodiment are represented by comparable reference characters in FIG. 4, and will not be described below. Only the different portions will be described below.

In the fourth embodiment, the device for restricting the forward movement of the clutch drum (cylinder member) 32 provided with the cylinder portion 32d is a step portion 22f formed on an outer peripheral side of the hub portion (inner peripheral portion) 22c of the clutch drum 22.

The clutch drum 32 of the clutch C-4 has a hub portion 32c that extends in such a fashion as to fit over an outer peripheral side of the hub portion 22c of the clutch drum 22 of the clutch C-3. An inner peripheral side of a distal end portion of the hub portion 32c and an outer peripheral side of a distal end portion of the hub portion 22c are provided with splines and are spline-mated with each other. Therefore, the operating oil chamber 36 of the hydraulic servo 30 of the clutch C-4 is supplied with the operating oil from the oil passage c13 of the boss portion 3a via the oil passage c16 of the clutch drum 22 and an oil passage c30 of the clutch drum 32. A gap between the clutch drum 22 and the clutch drum 32, that is, a gap between the oil passage c16 and the oil passage c30, is sealed by two seal rings a4, a8.

The drum portion 32b, which is an outer peripheral portion of the clutch drum 32, is not spline-mated with the drum portion 22b of the clutch drum 22. Therefore, when the clutch C-4 is engaged, the rotation (driving power) of the carrier CR is transferred to a member (not shown, but provided to the right of what is shown in FIG. 4) via the drum portion 32b, the flange portion 32a and the hub portion 32c of the clutch drum 32 as well as the hub portion 22c, the flange portion 22a and the drum portion 22b of the clutch drum 22. Thus, because the drum portion 32b of the clutch drum 32 and the drum portion 22b of the clutch drum 22 are not spline-mated, the piston member 23 does not have a cutout.

As described above, the step portion 22f is provided for restricting the forward movement of the clutch drum 32 relative to the clutch drum 22. As in the first embodiment, the fourth embodiment is structured so that the force that presses the clutch drum 32 to the step portion 22f side is always greater than the force that acts on the clutch drum 32 toward the cancel plate 34 side on the basis of the spring force of the return spring 35, the oil pressure of the cancel oil chamber 37 and the oil pressure of the operating oil chamber 36.

According to the above-described clutch-purpose hydraulic servo 30 of the fourth embodiment, the clutch drum 32 is a separate body from the cancel plate 34 and both are disposed on the hub portion 22c of the clutch drum 22 that undergoes the same rotation as the clutch drum 32. The step portion 22f prevents the clutch drum 32 from movement to a side opposite from the cancel plate 34 in an axial direction, relative to the clutch drum 22. The movement of the clutch drum 32 to a side of the cancel plate 34 in the axial direction is restricted by such an arrangement that the force that presses the clutch drum 32 to the step portion 22f side is always greater than the force that presses the clutch drum 32 to the cancel plate 34 side on the basis of the spring force of the return spring 35, the oil pressure in the cancel oil chamber 37 and the oil pressure in the operating oil chamber 36. Therefore, the above-described structure allows the clutch drum 32 to be a separate member from the clutch drum 22 and be pressed and fixed to the step portion 22f side. The structure therefore allows elimination of the process of integrating the clutch drum 32 and the clutch drum 22, for example, a welding process or the like, while facilitating compact design as compared with, for example, a structure where the cancel plate 34 is provided on a hub-shaped member that extends at an inner peripheral side of the clutch drum 32. Therefore, the clutch-purpose hydraulic servo 30 of the second embodiment allows improvement in the ease of assembly and reduction of the production processes and costs.

Due to the provision of the seal rings a4, a8 that seal the gap between the clutch drum 22 and the clutch drum 32, the oil in the operating oil chamber 36 can be sealed in. Therefore, although the clutch drum 22 and the clutch drum 32 are provided as separate members, the operating oil chamber 36 can be formed. That is, it becomes possible to provide the clutch drum 22 and the clutch drum 32 as separate members.

Furthermore, the clutch drum 32 of the clutch C-4 is enclosed within the clutch drum 22 that meshes with the friction plates 21 of the clutch C-3, and the member on which the cancel plate 34 and the clutch drum 32 are disposed is the clutch drum 22 of the clutch C-3. Therefore, the embodiment can be employed for a structure where two clutches are disposed within a clutch drum as described above.

Still further, the cylinder member is formed by the clutch drum 32 whose drum portion 32*b* is spline-mated, on the inner peripheral side thereof, with the friction plates 31, and the clutch drum 32 is spline-mated with the clutch drum 22 of the clutch C-3 in such a fashion that the clutch drum 32 is not rotatable relatively to the clutch drum 22. Therefore, the clutch C-4 can be structured without the need to form the clutch drum 22 of the clutch C-3 in a complicated configuration (see FIG. 3).

Furthermore, because the step portion 22*f* is formed in the hub portion 22*c* of the clutch drum 22 of the clutch C-3, it is not necessary to form a (penetrating) cutout in the piston member 23 although in some cases (see FIG. 1) the piston member 23 is provided with a (penetrating) cutout and the step portion 22*e* is formed in order to achieve the contact between the drum portion 22*b* of the clutch drum 22 of the clutch C-3 and the drum portion 32*b* of the clutch drum 32 of the clutch C-4. The step portion 22*f* can easily be formed in the production process.

As the clutch-purpose hydraulic servo 30 is used in the vehicular automatic transmission $1_4$, it becomes possible to improve the ease of assembly of the vehicular automatic transmission $1_4$ and reduce the production processes and costs thereof.

Although in the foregoing exemplary embodiments, the clutch-purpose hydraulic servo 30 is used in vehicular automatic transmissions $1_1$–$1_4$, the invention is not limited so, but may also be used in various other fashions.

Although in the forgoing embodiments, two clutches are provided and the hydraulic servo 30 is disposed on the clutch drum 22 of one of the two clutches, the embodiments may also be applied to, for example, a structure in which a cancel plate and a cylinder member of a hydraulic servo are disposed on the input shaft. That is, the embodiments are applicable to any structure as long as the structure has an arrangement where a cylinder member (clutch drum) and a cancel plate are disposed on shaft-like members that undergo the same rotation and where the cylinder member is disposed as a separate member.

Furthermore, in the first to fourth embodiments, the stopper device for restricting movement of the cylinder member (clutch drum) 32 in a forward direction (i.e., a direction opposite to the direction to the cancel plate 34) is the step portion 22*e*, the step portion 22*f*, or the snap ring 38. However, the stopper device is not so limited. That is, any stopper device may be used as long as the device restricts forward movement of the cylinder member that is a separate member from the shaft member.

Still further, although in the first to fourth embodiments, the clutch-purpose hydraulic servo 30 is used in multi-speed automatic transmissions $1_1$–$1_4$ that are equipped with a planetary gear DP and a planetary gear unit and that accomplish multi-speed shifting, the clutch-purpose hydraulic servo 30 is not so limited, but may also be used in, for example, belt-type continuously variable transmissions and the like. In short, the clutch-purpose hydraulic servo may be used in any type of automatic transmission.

What is claimed is:

1. A clutch-purpose hydraulic servo, comprising:
    a cylinder member having a cylinder portion;
    a piston member for pressing a friction plate;
    a return spring that presses the piston member toward the cylinder portion;
    a cancel plate that is restricted at least from moving to a side opposite from the return spring in an axial direction and that receives a reaction force of the return spring, wherein the cylinder member is disposed as a separate member on a shaft member on which the cancel plate is disposed and which undergoes the same rotation as the cylinder member;
    an operating oil chamber formed between the piston member and the cylinder portion so as to press the piston member based on a supplied oil pressure;
    a cancel oil chamber formed between the piston member and the cancel plate; and
    a stopper device that prevents the cylinder member from movement to a side opposite from the cancel plate in an axial direction, relative to the shaft member, wherein restriction of a movement of the cylinder member to a side of the cancel plate in an axial direction is achieved by such an arrangement that a force, that presses the cylinder member to a side of the stopper device, is always greater than a force, that presses the cylinder member to the side of the cancel plate, based on a spring force of the return spring, an oil pressure in the cancel oil chamber and an oil pressure in the operating oil chamber.

2. The clutch-purpose hydraulic servo according to claim 1, further comprising a seal device that seals a gap between the shaft member and the cylinder member.

3. The clutch-purpose hydraulic servo according to claim 2, which is used in a first clutch whose cylinder member is enclosed in a drum member that meshes with a friction plate of a second clutch, wherein the shaft member is a drum member of the second clutch.

4. The clutch-purpose hydraulic servo according to claim 3, wherein the cylinder member is formed by a drum member that has a drum portion that is spline-mated with the friction plate, and the drum member is spline-mated with the drum member of the second clutch so that the drum member is not rotatable relative to the drum member of the second clutch.

5. The clutch-purpose hydraulic servo according to claim 4, where the stopper device is a step portion formed in the drum member of the second clutch.

6. The clutch-purpose hydraulic servo according to claim 5, wherein the step portion is formed on an inner peripheral side of an outer peripheral portion of the drum member of the second clutch.

7. The clutch-purpose hydraulic servo according to claim 6, which is used in a vehicular automatic transmission.

8. The clutch-purpose hydraulic servo according to claim 5, wherein the step portion is formed on an outer peripheral side of an inner peripheral portion of the drum member of the second clutch.

9. The clutch-purpose hydraulic servo according to claim 8, which is used in a vehicular automatic transmission.

10. The clutch-purpose hydraulic servo according to claim 3, wherein the friction plate is spline-mated directly with the drum member of the second clutch instead of being connected for actuation to the cylinder member of the first clutch.

11. The clutch-purpose hydraulic servo according to claim 10, wherein the stopper device is a snap ring fastened to the shaft member.

12. The clutch-purpose hydraulic servo according to claim 11, which is used in a vehicular automatic transmission.

13. The clutch-purpose hydraulic servo according to claim 3, wherein the stopper device is a snap ring fastened to the shaft member.

14. The clutch-purpose hydraulic servo according to claim 13, which is used in a vehicular automatic transmission.

* * * * *